J. TALLON.
Machine for Pounding Rice.
No. 21,156.
Patented Aug. 10, 1858.
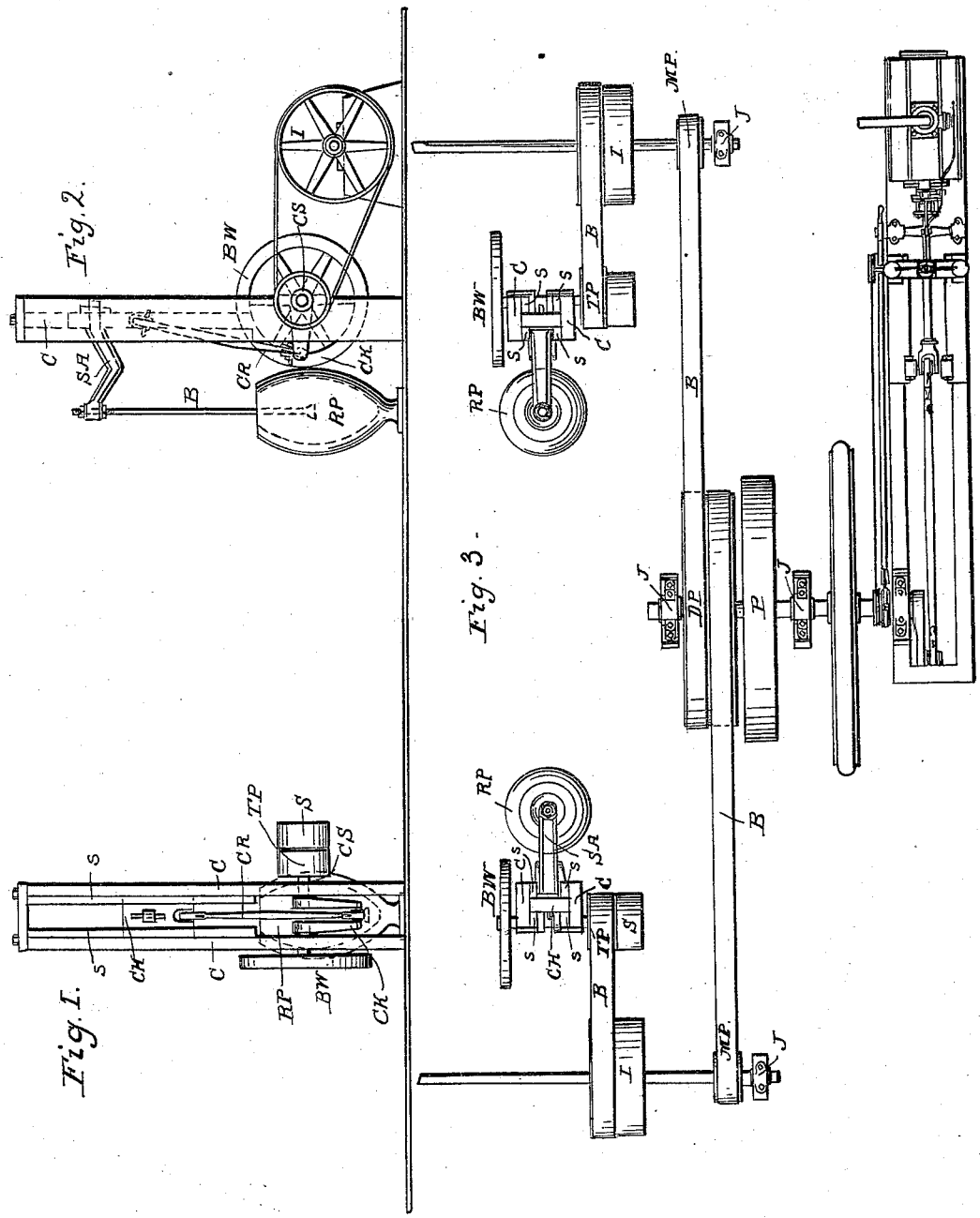

UNITED STATES PATENT OFFICE.

JNO. TALLON, OF NEW ORLEANS, LOUISIANA.

MACHINE FOR POUNDING RICE.

Specification of Letters Patent No. 21,156, dated August 10, 1858.

*To all whom it may concern:*

Be it known that I, JOHN TALLON, of New Orleans, in the parish of Orleans and State of Louisiana, have invented certain new and useful Improvements in Machines for Pounding Rice; and I do hereby declare that the same is described and represented in the following specifications and drawings.

To enable others skilled in the art to make and use my improvements I will proceed to describe their construction and operation referring to the drawings in which the same letters indicate like parts in each of the figures.

Figure 1, is an elevation of the rear of the machine. Fig. 2, is an elevation of one side. Fig. 3, is a plan of the machine with a steam engine connected to it, to operate it.

In the accompanying drawings A, is the floor.

C, C, are two posts firmly fastened in upright position and connected at the top by a bar, as shown in Fig. 1. Each of these posts is provided with two ribs S, S, which form grooves on the sides of the posts opposite to each other for the ends of the cross head C, H, to traverse in. This cross head has an arm S, A, firmly fastened to it, by being put through a hole in the cross head as shown in the drawing. This arm is perforated perpendicularly at its outer end, for the pounder P, which passes through it and has a screw thread upon it, so as to be fastened by two nuts, one above and the other below the arm, so as to adjust and fasten it, higher or lower as required. This pounder P, may be made in the form shown in the drawing Fig. 2. A wrist is formed at the bottom of the cross head for the upper end of the connecting rod C, R, the lower end of which rod is applied to the wrist of the crank C, K, arranged to turn in boxes on the posts C, C, the shaft of which crank is marked C, S, in the drawing, is provided with a loose pulley S', and fast pulley T, P, for the band B, to turn the crank and operate the pounder P. The band B, is carried by the pulley I, on the shaft P, S, which has the pulley M, P, fastened to it, and is turned by the band B', from the pulley D, P, on the crank shaft of the steam engine shown in the drawing.

B, W, is a balance wheel on the crank shaft to equalize the motion of the crank shaft and pounder.

R, P, is a pot for holding the rice while it is pounded by the pounder P, which I have found to work well and not break the rice if the end of the pounder stops about four and one half inches, from the bottom of the pot. I prefer these pots when made with a cast iron base or foot, by which they may be fastened in the desired position under the pounder, to which base or foot, I fasten an egg shaped zone, made of smooth sheet iron by riveting it to the cast iron, taking care to make the inside of the pot as smooth as I can. I prefer pots made in this way because they are more yielding and break the rice less than the rigid pots made entirely of cast iron or of wood lined with iron. I also prefer to make the inside of the pot in the form of an egg, the bottom of the pot being in the form of the little end of the egg, as I think the rice is less likely to be broken when made in that form.

I believe I have described and represented my improvements in machines for pounding rice, so as to enable any person skilled in the art to make and use them.

I will now state what I desire to secure by Letters Patent, to wit:

I claim the combination of the pounder P, arm S A cross head C H connecting rod C R and crank C K constructed and arranged to operate in relation to each other as shown and described and for the purposes set forth.

JOHN TALLON.

Witnesses:
 Jos. F. DICK,
 CHARLES V. JONTO.